United States Patent [19]

Dominguez

[11] Patent Number: 4,612,086
[45] Date of Patent: Sep. 16, 1986

[54] EVAPORATORS

[75] Inventor: Aurelio D. Dominguez, Godoy Cruz, Argentina

[73] Assignee: Inquimet Sociedad Anonima Industrial Comercial y Agraria, Argentina

[21] Appl. No.: 733,140

[22] Filed: May 10, 1985

[30] Foreign Application Priority Data

May 11, 1984 [AR] Argentina .............................. 296637

[51] Int. Cl.$^4$ ................................................ F28D 7/12
[52] U.S. Cl. ...................................... 159/6.1; 165/156; 165/164
[58] Field of Search .................. 165/156, 76, 164, 165, 165/140, 146, 147; 159/1 R, 1 C, DIG. 10, 6.1, 11.1, 49

[56] References Cited

U.S. PATENT DOCUMENTS 4,402,361 9/1983 Dominguez .......................... 165/156

Primary Examiner—Frank Sever
Attorney, Agent, or Firm—Lerner, David, Littenberg, Krumholz & Mentlik

[57] ABSTRACT

An evaporator for eliminating water from liquids or for cooling liquids by direct expansion of a refrigerant fluid, comprising at least three frusto-conical jackets which include an outer jacket, an inner jacket, and at least one intermediate jacket. Said jackets are coaxially superimposed so as to define annular spaces therebetween. The ends of the jackets are closed except the small end of the internal jacket, which is open and communicates with a chamber defined inside the inner jacket. Inlet and outlet means for a first fluid are connected with respective ends of the annular space between the outer jacket and the adjacent intermediate jacket, and inlet and outlet means for a second fluid are connected respectively to the large end of the annular space between the inner jacket and the adjacent intermediate jacket. A helical element is arranged at least in the annular space between the inner jacket and the adjacent intermediate jacket and defines, with the adjacent conical surfaces of said annular space, a helical channel leading from the inlet to the outlet of said space. The first fluid is a heat donating or heat accepting fluid and the second fluid undergoes a change of state while it flows in the helical channel defined between the inner jacket and the adjacent intermediate jacket. In some applications of the apparatus, both fluids undergo a change of state.

11 Claims, 2 Drawing Figures

EVAPORATORS

BACKGROUND OF THE INVENTION

This invention refers to evaporators and more particularly, to evaporators for eliminating water contained in liquids and for cooling liquids by direct expansion of a refrigerant fluid.

The necessity of driving off superfluous water from products in order to render them more stable and concentrated is quite common in industry, particularly in the food industry. Typical examples are the production of evaporated milk, dehydrated coffee, fruit-juice concentrates, cane sugar, etc.

The most common type of evaporators for concentrating liquids comprises a heating unit consisting of a bank of tubes, usually vertical, arranged inside an enclosure or shell. Low pressure steam is admitted into the heating unit while the product to be concentrated or evaporated flows in contact with the tubes.

There are variations of this apparatus. In some of them the bank of tubes is arranged vertically; in others, the tubes are horizontal. There are also evaporators in which the product to be concentrated flows through the tubes while the steam flows externally thereof.

The efficiency of these evaporators is rather poor and they are usually arranged in series whereby the latent heat of the vapors is made to do duty several times. The shells are under vacuum and each suceeding shell has a higher vacuum and therefore, a lower boiling temperature than the one preceding it. The vapor from the boiling product passes over the heating unit of the second shell, where, due to the higher vacuum, the product boils at a lower temperature releasing vapor for boiling the material in the second shell and so on. The vapor from the final shell goes to a condenser.

Evaporators used in liquid cooling apparatus are part of a refrigeration circuit comprising a compressor, an expansion valve and a condenser. The evaporator, usually consisting of serpentine tubing or ducts, is either immersed into the liquid to be cooled (direct expansion system) or arranged in heat-exchange relationship with the fluid to be cooled.

Brine circulation is generally preferred to direct expansion so as to avoid danger from escaping ammonia or other refrigerant in case the tubing should leak.

Brine coolers are usually of the shell and tube or of the shell and coil type.

Thus, the evaporatros for concentrating products and the evaporators used in cooling liquids are essentially heat-exchangers operating basically on the same principle.

The quantity of heat transferred in this type of apparatus is governed by three main factors: (a) the extension and nature of the heat transfer surface exposed to both fluids, which depends on the number and length of the tubes; (b) the overall coefficient of heat transfer from one fluid through the intervening wall to the other fluid, which depends on the velocity of flow, and the shape and arrangement of the heating surface; and (c) the main temperature difference across the intervening wall from one fluid to the other.

For the fluid flowing through the tubes, the velocity is determined quite precisely by the flow rate and the number and diameter of the tubes. The velocity of the other fluid, which flows inside the shell externally of the tubes, also depends on the flow rate and the passage section defined among the tubes, but flow conditions may vary considerably from one area to another of the concentrator or evaporator.

Conventional evaporators are difficult to disassemble and assemble and have inaccessible surfaces which cannot be cleaned with simple methods or inspected visually in order to ensure that they adhere to adequate sanitary conditions. Therefore, these known evaporators are not well suited for use in applications where thorough and frequent cleaning of the internal parts of the apparatus is required, nor in processes which do not tolerate even minute amounts of contaminants.

For a more detailed discussion of the problems encountered in heat exchangers used in the food industry, reference is made to U.S. Pat. No. 4,402,361, sharing a common assignee with the instant application.

U.S. Pat. No. 4,402,361 refers to a heat exchanger comprising two or more frustoconical, coaxially superimposed jackets having a helical spacer therebetween which defines a helical fluid passage with the facing conical surfaces of the jackets. The helical spacer is freely and releasably mounted in the annular space between the jackets so that it may be removed for cleaning purposes or replaced by another one having a different geometrical configuration to vary the specifications of the heat exchanger.

The heat exchanger of this U.S. patent has proved to be very effective in treating food and pharmaceutical products.

It has now been found that the use of frusto-conical jackets with a helical spacer defining a helical channel therebetween is particularly effective in the evaporation of liquids where it provides unforeseen advantages and unexpected results.

SUMMARY OF THE INVENTION

Therefore, it is a main object of this invention to provide a highly efficient evaporator, of simple construction, easy to disassemble and re-assemble, and permitting the processing of food products in sanitary conditions.

Another object of the invention is to provide an evaporator in which both intervening fluids flow at great velocities, in turbulent conditions and through closely adjacent paths in order to improve heat transmission therebetween and consequently enhance the overall efficiency of the apparatus.

Another object of the invention is to provide an evaporator for cooling liquids by direct expansion of a refrigerant fluid in which the refrigerant and the liquid to be cooled flow in side by side relationship and in optimum heat-transfer conditions.

A further object of the invention is to provide an evaporator in which foaming of the liquid to be concentrated or of the refrigerant being expanded is reduced to a minumum or altogether.

A still further object of the invention is to provide an evaporator which permits varying the technical specifications of the apparatus to adapt them to the treatment of fluids having different characteristics and requiring diverse flow rates, velocities and residence times.

To these ends, the invention provides an evaporator comprising at least three frusto conical jackets which include an outer jacket, an inner jacket, and at least one intermediate jacket. Said jackets are coaxially superimposed so as to define annular spaces therebetween. The ends of the jackets are closed, except the small end of the internal jacket, which is open and communicates with a chamber defined inside the inner jacket. Inlet and outlet means for a first fluid are connected with respective ends of the annular space between the outer jacket and the adjacent intermediate jacket, and inlet and outlet means for a second fluid are connected respectively to the large end of the annular space between the inner jacket and the adjacent intermediate jacket and to the base of the chamber defined inside said inner jacket. A helical element is arranged at lealst in the annular space between the inner jacket and the adjacent intermediate jacket and defines, with the adjacent conical surfaces of said annular space, a helical channel leading from the inlet to the outlet of said space.

The first fluid is a heat donating or heat accepting fluid and the second fluid undergoes a change of state while it flows in the helical channel defined between the inner jacket and the adjacent intermediate jacket. In some applications of the apparatus, both fluids undergo a change of state.

In the liquid concentrating version, the jackets are arranged with their small ends pointing downwardly and the small end of the intermediate jacket defines or prolongues into a collecting chamber for concentrated liquid. Helical elements are provided in the annular spaces defined between all the jackets. The inner jacket tapers more steeply than the other jackets so that the cross section of the annular space defined between the inner jacket and the adjacent intermediate jacket increases towards the collector chamber.

In the liquid cooling version of the apparatus of the invention, the annular space between the inner jacket and the intermediate jacket is traversed by a refrigerant fluid while the space between the outer jacket and the intermediate jacket is traversed by a fluid to be cooled. The heat exchange takes place through the wall of the intermediate jacket, and the chamber defined inside the internal jacket is connected to a compressor of refrigerant fluid. The rapid rotation of the refrigerant fluid while flowing through the helical channel facilitates the evaporation and the separation of liquid particles and, at the same time, provides a very efficient heat-exchange with the liquid to be cooled.

DESCRIPTION OF THE PREFERRED EMBODIMENTS

Figure 1:
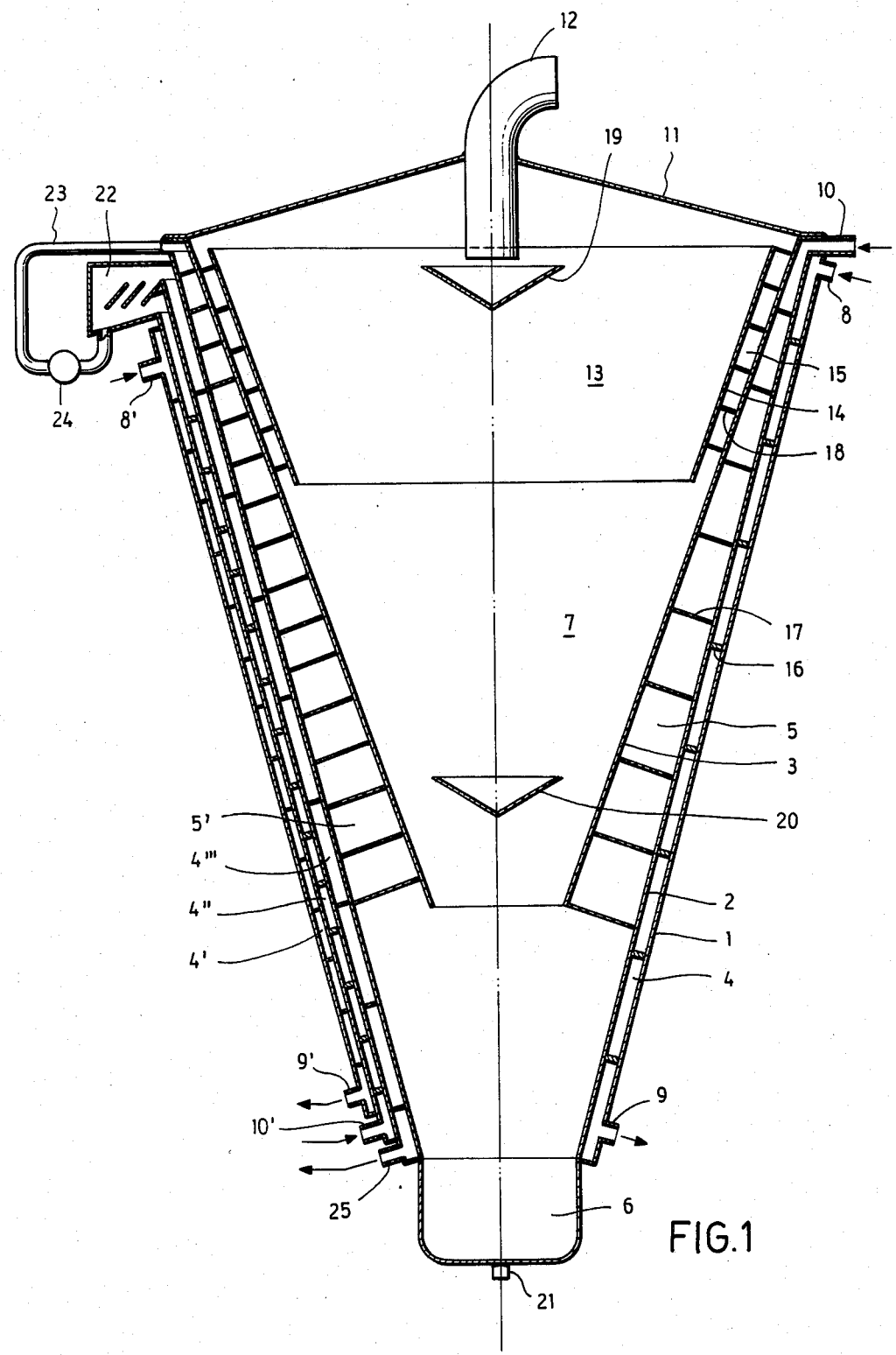
FIG. 1 is a longitudinal, somewhat schematic cross section of an evaporator for concentrating liquids according to two possible embodiments of the invention shown respectively on the left and on the right of the longitudinal axis.

With reference to FIG. 1, and particularly to the right side thereof, the evaporator comprises three frusto-conical jackets including an outer jacket 1, an intermediate jacket 2 and an internal jacket 3, which are coaxially superimposed or nested so as to define annular spaces 4 and 5 therebetween. The jackets are arranged with their small diameter ends pointing downwardly, and the small diameter end of the inner jacket 3 is prolongued into a substantially cylindrical collecting chamber 6.

The ends of the outer jacket 1 and intermediate jacket 2 are closed while the smaller end of the inner jacket 3 is open and communicates with a chamber 7 defined inside the inner jacket. The larger ends of the jackets are closed and inlet and outlet conduits 8, 9 for a heating fluid are connected to the upper and lower ends, respectively, of the annular space 4 between the outer and intermediate jackets.

The inner jacket 3 has a steeper taper than the remaining jackets so that the cross section of the annular space 5 defined between the inner and intermediate jackets increases towards the collecting chamber 6.

The annular space 5 has an inlet conduit 10 for the liquid to be concentrated, which is arranged adjacent its larger end. The base of chamber 7 is closed by a conical plate 11 and connected to a source of vacuum (not shown) by an outlet conduit 12 which traverses said plate 11.

Plate 11 is connected to the assembly formed by the various frustoconical jackets by means of releasable clamps (not shown) which facilitate removal of plate 11 for cleaning or inspecting the apparatus.

Preferably, a droplet separating chamber 13 is provided. This chamber is formed by a further frusto-conical jacket 14, shorter than the others and adjacent to the inner conical surface of the inner jacket 3 and defining therewith an annular space 15. The purpose of the droplet separating chamber will be explained below.

Helical elements 16, 17 and 18, respectively, are arranged into the annular spaces 4, 5 and 15, and define, with the adjacent conical walls of the jackets, helical channels leading from one end to the other of the respective annular space.

The helical elements 16, 17 and 18 may be fixed to or stamped on an adjacent conical wall, or may be freely and releasably mounted so as to be removed and replaced by other elements of the same or different geometry.

Conical baffles 19 and 20 are provided adjacent the inner end of conduit 12 and the open end of the inner jacket 3, respectively.

Operation of this embodiment of the evaporator is as follows:

Heating fluid, preferably steam, is admitted through inlet conduit 8 to the annular space 4. The heating fluid flows through the helical channel formed in said space, gives up its latent heat and exits as a condensate through the outlet conduit 9 in the small end of space 4.

Preferably, the pitch of the helical element 16 contained in the annular space 4 between jackets 1 and 2 decreases from the top, inlet portion to the bottom, outlet portion. That is, the coils of the helical element 16 are closer to each other in the direction of flow of the heating fluid because the volume of the vapor phase is larger than that of the liquid phase. The condensed water is driven by centrifugal force against the wall of jacket 1 and flows through small notches (not shown) provided in the edge of the helical element.

Since the wall of the intermediate jacket 2 is essentially in contact with steam in turbulent flow and there is virtually no thin film of stagnant fluid, the coefficient of heat transmission is extremely high.

Liquid to be concentrated is admitted through the inlet conduit 10, at the large end of annular space 5. This liquid flows through the helical channel formed in this space, receives heat through the wall of the intermediate jacket 2, and generates vapor. The growing cross section of said helical channel provides sufficient room for the generated vapors. These vapors rotate at a very high velocity thus entraining, driving and adhering liquids against the wall of the intermediate chamber 2. The vapors, with the entrained liquids reach the bottom of the helical channel; the liquids exit through an outlet 21 in the collecting chamber 6 while the vapors, spinning in the same direction, ascend through the inner chamber of jacket 3 the cross section of which increases upwardly. Upon encountering increasingly larger sections, these vapors decrease their velocity causing separation of small droplets that might have been entrained therein, which fall down into the collecting chamber 6. The vapor, meantime, exit through the upper conduit 12, sucked by the vacuum source.

With reference now to the embodiment shown in the left half of FIG. 1, it will be seen that its construction and operation principle are essentially the same as those of the embodiment on the right side of the figure. The difference is that the evaporator of the second (left) embodiment comprises five coaxially superimposed frusto-conical jackets defining therebetween first (4'), second (4"), third (4'''), and fourth (5') annular spaces. The large ends of the second and third spaces 4", 4''' are connected to an annular vapor separating chamber 22 containing baffles 22' which in turn is connected with the fourth space 5' by means of a conduit 23. In this embodiment, a heating fluid, for instance steam, flows through the first space 4', while the liquid to be concentrated circulates through the second space 4". This liquid is admitted through inlet 10', raises to the separating chamber 22 and is transferred by a pump 24 to he fourth space 5' while emerging vapors descend through the third space 4''' and exit as a condensate through a bottom outlet 25. The pre-concentrated liquid flowing through the helical channel in the inner space 5' undergoes the same process explained with reference to the first embodiment. The condensate from outlet 25 is combined with the condensate from outlet 21.

Helical elements are installed in spaces 4', 4", 4''' and 5' which define respective helical flow channels.

The embodiment of evaporator which has just been described has a higher efficiency than the first embodiment because it has more heat exchanging surfaces.

The inlet and outlet conduits have been represented as radial for simplicity although in practice they are tangential to the jackets.

Figure 2:
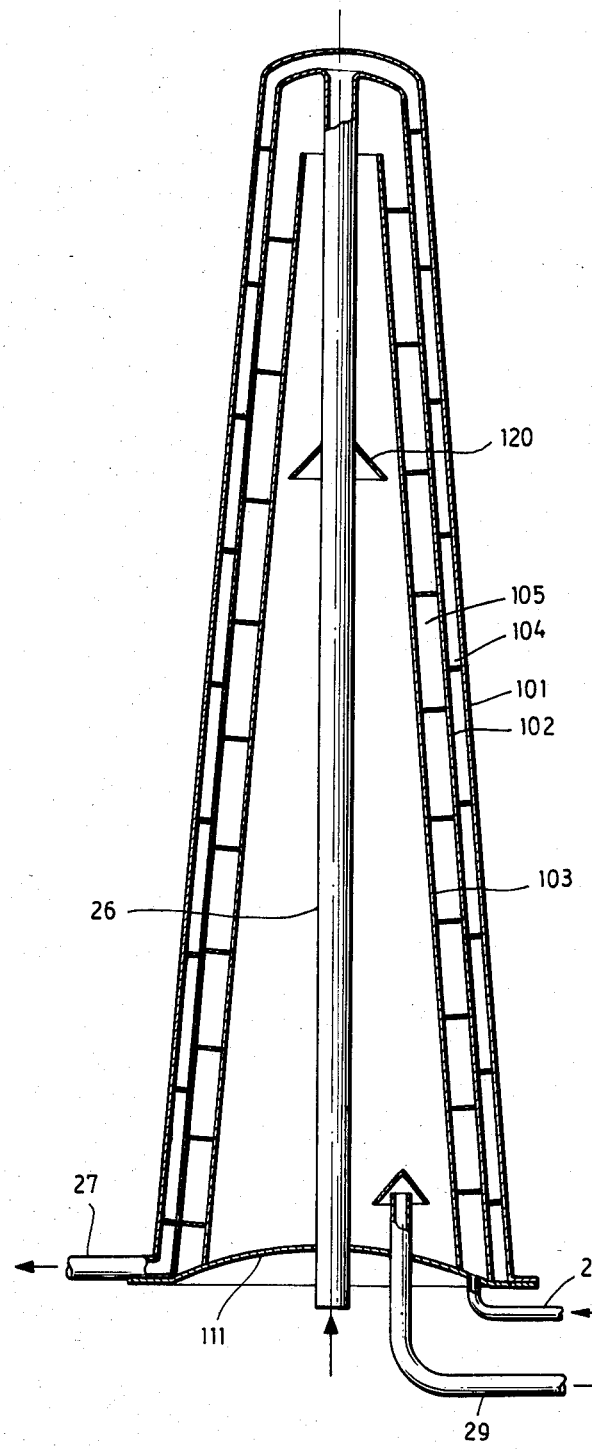
FIG. 2 is a longitudinal, also schematic, section of a liquid cooler built in accordance with the invention.

With reference now to FIG. 2, a liquid cooler in accordance with the invention is shown therein.

The liquid cooler is similar to the evaporator of FIG. 1 in that it comprises three or more frusto-conical jackets comprising an outer jacket 101, an intermediate jacket 102 and an outer jacket 103 coaxially superimposed and defining annular spaces 104 and 105 therebetween. Helical spacers or elements 116 and 117 are arranged in the annular spaces 102 and 103, respectively and define respective helical channels with the adjacent conical walls of the jackets.

The small ends (i.e. the smaller diameter ends) of the outer and intermediate jackets are closed whereas the small end of the inner jacket is open and communicates with the inner chamber 107 of the latter. The bases or large ends of the three jackets are closed by a concave closure plate 111, which is preferably welded to the inner and intermediate jackets 102, 103, and attached to the outer jacket by quick release clamps (not shown).

The provision of a concave closure plate permits that the inlet area of the refrigerant fluid be above the terminal coils of the helical channel for the liquid to be cooled, thus preventing the freezing of such liquid in the "dead spaces" of the helical channel.

The concave closure plate may be replaced by a dished plate having a rim and an inwardly recessed central portion.

A central conduit 26 passes through the closure plate 111 and communicates with the space between the outer and intermediate jackets. The liquid to be cooled raises through this central conduit 26, and after passing through the helical channel defined in space 104, exits through an outlet 27, adjacent the large end of the outer jacket.

The refrigerant fluid is admitted through an inlet conduit 28 connected to the large end of space 105 and after passing through the helical channel defined in space 105 enters the inner chamber 107 of the inner jacket and exits through a conduit 29 connected to a compressor (not shown).

The refrigerant fluid (for instance freon (R) or ammonia), which enters as a liquid through inlet conduit 28, accepts heat from the liquid to be cooled and evaporates while flowing through the helical channel defined between the inner and intermediate jackets.

The pitch of the helical element 117 increases towards the small end of annular space 105 to accomodate the expanded volume of the refrigerant vapors.

Obviously, the evaporator defined between the inner and intermediate jackets, forms part of a refrigerating circuit comprising a compressor, a condenser, and an expansion valve.

The high velocity of the refrigerant in the helical channel in space 105 develops a centrifugal force which causes the liquid particles entrained by the vapors to adhere to the wall of the intermediate jacket 102, while the vapors raise and enter the inner space 107 of the inner jacket and pass from there to the compressor (not shown).

A conical baffle 120 is mounted on conduit 26 for separating droplets of refrigerant fluid carried by the refrigerant vapor.

The inlet and outlet conduits 28 and 27 are preferably tangential to the respective jackets.

The advantage of this arrangement of coaxially superimposed frustoconical jackets spaced by helical elements is that both the liquid and the gaseous phases flow at high velocities and therefore. very high thermal coefficients are developed. The helical flow of the fluid results in lower friction losses due to the fact that the centrifugal force arranges the molecules. The centrifugal force, which acts on the heavier molecules, i.e. the liquids, drives them outwardly causing them to adhere to the walls through which they receive heat and form thin films thereon. The gaseous phase, having a substantially lower density, is arranged inwardly, adjacent to the liquid phase. The extremely high velocity of the molecules of the gaseous phase drives the molecules of the liquid phase along the helical path.

The present invention provides the following advantages:

1. A higher heat transfer efficiency per unit of surface.

2. Residence time of the products to be concentrated or of the liquids to be cooled is very low, sometimes as low as 3 to 6 sec.

3. In concentration processes, the low residence time and the short contact time with the heating wall results in products of higher quality and avoids formation of undesirable substances (resulting in coloring, flavor loss, oxidation, etc.).

4. Due to the high velocity of flow, no salt deposits are formed on the heat exchange surfaces. In accordance with the tests made in the cooling of wines, when the velocity is lowered, bitartrate deposits start to build. In the apparatus of the invention, the normal operating velocity is 150% higher than the velocity of deposit. In the concentrator, the very high velocity discourages product deposits, thus permitting a continuous, maintenance free operation for prolongued periods of time.

5. The very low quantities of liquid flowing through the apparatus permit immediate reaction upon the occurence of any change in the operative conditions of the process. In the case of the evaporator for concentrating liquids, steady flow conditions are obtained in less than ten minutes and should any mishap occur, the amount of wasted product is very minor. It should be born in mind that there are less than 2 liters of liquid to be concentrated per $m^2$ of heating surface.

In the cooling apparatus built in accordance with the invention, the amount of refrigerant fluid required is very low, up to 25% less than in conventional equipment. This allows a substantial economy of refrigerant, and when ammonia is used, results in a safer operation considering the minor amount of refrigerant contained at any time in the apparatus.

6. In view of its higher efficiency the apparatus of the invention is substantially smaller than conventional equipment of the same capacity, which results in cost and space savings.

7. The design of the apparatus simplifies its construction and permits easy disassembly for thorough cleaning when necessary. Due to the high velocity of flow, cleaning with chemicals can be effected quickly and efficiently.

8. The apparatus is of sanitary construction, which permits processing both food and pharmaceutical products.

9. The apparatus of the invention is very flexible and may be adapted to different products and varying flow conditions. The specifications may be changed at will, for instance by varying the spacing between jackets, changing the pitch of the helical elements to vary the required section of the flow channels or by providing more than one inlet so as to have two, three or more helical channels through which various currents flow independently. This permits shorter travel and obtaining the same effect with lower heat losses and lower residence times.

10. Due to the high velocity of flow in a helical path, a strong centrifugal force is developed which permits thorough separation of the gaseous and liquid phases with the advantage that no foam is formed. In most known evaporators, the presence of foam causes a substantial decrease in efficiency due to liquid entrained in the vapors. To solve this problem, complicated designs or larger size equipment are required, which makes construction more expensive.

While the invention has been described in conjunction with a specific embodiment, it is to be understood that many alternatives, modifications, and variations will be apparent to those skilled in the art in the light of the aforegoing description. Accordingly, this invention is intended to embrace all such alternatives, modifications, and variations which fall within the spirit and scope of the appended claims.

We claim:

1. An evaporator for eliminating water from liquids or for cooling liquids by direct expansion of a refrigerant fluid, comprising at least three substantially frusto-conical jackets including an outer jacket, an inner jacket and at least one intermediate jacket, said jackets being coaxially superimposed so as to define respective annular spaces therebetween, each of said jackets having a small end and a large end, the ends of the jackets being closed, except the small end of the inner jacket, which is open and communicates with a chamber defined inside the inner jacket; inlet and outlet means for a first fluid connected to respective ends of the annular space between the outer jacket and the adjacent intermediate jacket; inlet and outlet means for a second fluid respectively connected to the large end of the annular space between the inner jacket and the adjacent intermediate jacket and to the base of the chamber defined inside said inner jacket; and a helical element disposed at least in the annular space between said inner jacket and the adjacent intermediate jacket and defining with the adjacent conical surfaces of said annular space, a helical channel leading from the inlet to the outlet of said space, said first fluid being a heat donating or heat accepting fluid, and said second fluid undergoes a change of state while flowing in the helical channel defined between the inner jacket and adjacent intermediate jacket, means for enabling the centrifugal force acting on said second fluid to assist in separating said second fluid into liquid and gaseous phases, the liquid phase being arranged in contact with the inner wall of the intermediate jacket, and including the cross-section of the helical channel between the inner jacket and the adjacent intermediate jacket being dimensioned to increase from the respective inlet means towards the respective outlet means sufficient to accommodate the increased volume of the gaseous phase.

2. An evaporator as claimed in claim 1, wherein said jackets are arranged with their small ends pointing downwardly, a collecting chamber connected with the small end of the intermediate jacket adjacent the inner jacket; helical elements arranged in all the annular spaces defined by adjacent jackets, the inner jacket having a steeper taper than the remaining jackets so that the annular space defined between said inner jacket and the adjacent intermediate jacket increases its cross section towards said collecting chamber; said first fluid being a heating fluid and said second fluid being a liquid to be concentrated; the base of the chamber defined in the interior of said inner jacket being connected to a source of vacuum and said collecting chamber having an outlet for concentrated product.

3. An evaporator as claimed in claim 2, characterized by comprising five coaxial frusto-conical jackets defining therebetween first, second, third and fourth annular spaces, said third jacket having a bottom outlet, a vapor separating chamber connected to the large ends of said second and third spaces, said vapor separating chamber being connected to said fourth space, pumping means between said vapor separating chamber and said fourth space; said first space being traversed by a heating fluid and said second space being traversed by the liquid to be concentrated, which raises to said vapor separating chamber and is transferred by the pumping means to said fourth space while the vapors descend through the third space and exit as a condensate through said bottom outlet.

4. An evaporator as claimed in any one of claims 2 or 3, comprising a drop separating chamber formed by a short frusto-conical jacket adjacent the inner conical surface of the inner jacket and defining therebetween an annular space permitting the separation of droplets of the liquid to be concentrated.

5. An evaporator as claimed in claim 1, further including means for releasably attachingn said jackets and their large ends and for sealing the large end of said annular spaces, whereby said evaporator may be readily disassembled and reassembled.

6. An evaporator as claimed in claim 1, wherein said helical element is removably mounted in said helical channel and may be replaced by another helical element having a different geometrical configuration in order to change the specifications of said evaporator.

7. A refrigeration apparatus for cooling liquids by direct expansion of a refrigerant fluid, comprising three substantially frusto-conical jackets including an outer jacket, an inner jacket and one intermediate jacket, said jackets being coaxially superimposed so as to define respective annular spaces therebetween, each of said jackets having a small end and a large end, the ends of the jackets being closed, except the small end of the inner jacket, which is open and communicates with a chamber defined inside the inner jacket; inlet and outlet means for a liquid to be cooled connected to respective ends of the annular space between the outer jacket and the intermediate jacket; inlet and outlet means for a refrigerant fluid respectively connected to the large end of the annular space between the inner jacket and the intermediate jacket and to the base of the chamber defined inside said inner jacket; and a helical element disposed in each of said annular spaces and defining with the adjacent conical surfaces of the respective annular space, a helical channel leading from the inlet to the outlet of said space, said inlet means for refrigerant fluid being connected to a condenser and said chamber being connected to a compressor, means for enabling the centrifugal force acting on the refrigerant fluid to assist in separating the refrigerant fluid into liquid and gaseous phases, the liquid phase being arranged in contact with the inner wall of the intermediate jacket and including the cross-section of the helical channel between the inner jacket and the adjacent intermediate jacket being dimensioned to increase from the respective inlet means towards the respective outlet means sufficient to accommodate the increased volume of the evaporated refrigerant fluid.

8. A refrigeration apparatus as claimed in claim 7, wherein the inlet means for refrigerant fluid are arranged above the adjacent terminal coils of the channel for the liquid to be cooled.

9. A refrigeration apparatus as claimed in claim 7, wherein the pitch of the helical element arranged in the annular space between the inner and intermediate jackets increases towards the small ends of the jackets.

10. A refrigeration apparatus as claimed in claim 7, further including means for releasably attaching said jackets at their large ends and for sealing the large end of said annular spaces, whereby said apparatus may be readily disassembled and reassembled.

11. A refrigeration apparatus as claimed in claim 7, wherein said helical element is removably mounted in said helical channel and may be replaced by another helical element having a different geometrical configuration in order to change the specifications of said apparatus.

* * * * *